6450X
S. Lane.
Thrashing Mach.
Patented Apr. 6, 1831.
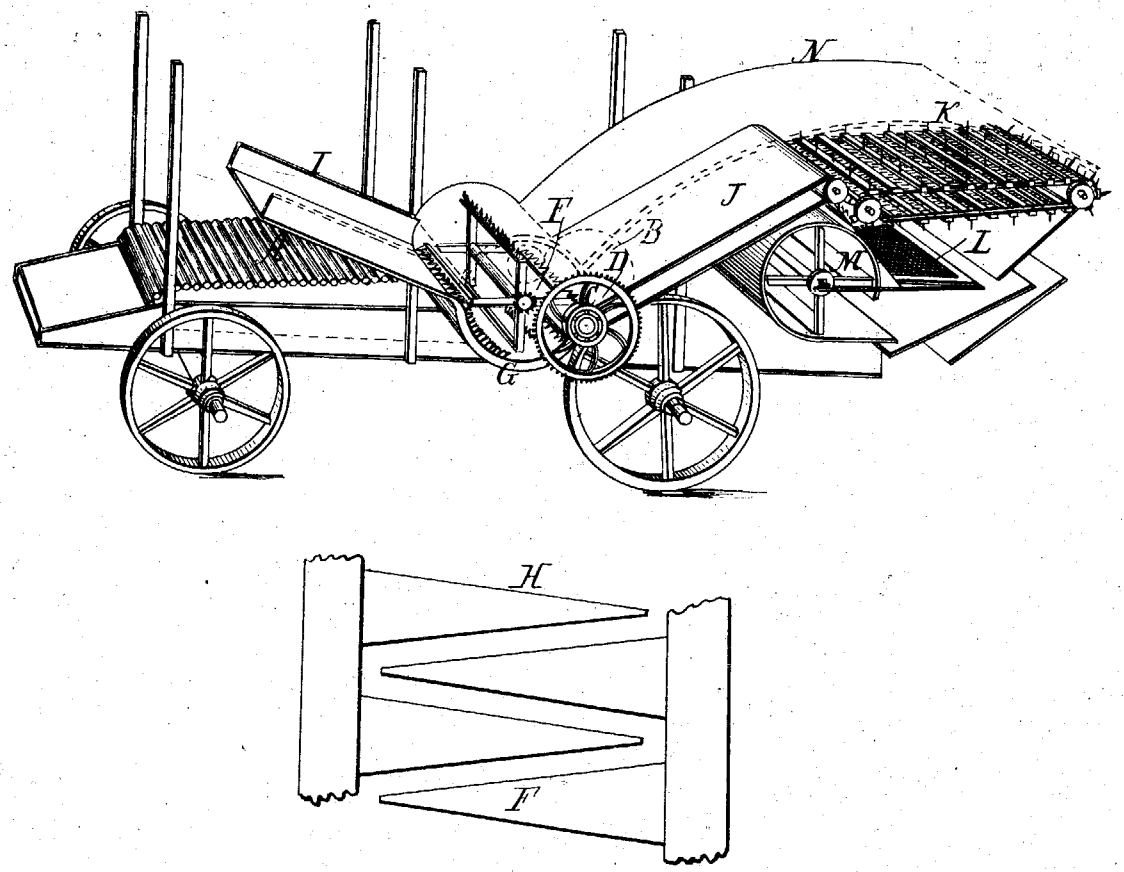

Samuel Lane 6450x
Letters Patent

The Schedule referred to in these Letters Patent and making part
of the same containing a description in the words of the said Sam-
uel Lane himself of his improvements in the machinery for
thrashing and cleaning wheat and other grain
To all whom it may concern. Be it known that I Samuel Lane
have invented certain improvements on the machine for thrashing
and cleaning wheat and other grains which I denominate The port-
able horse power thrashing and Cleaning machine and that the
following is a full and exact description of the said machine with my
improvements thereon. The power which I employ to drive my thrash
ing machine the endless chain and rail way horse power patented by
me on the 17th of May 1830. The mode of doing this and likewise
the general structure of the machinery is represented in the accom
panying drawings A represents the inclined plane upon which
the horse walks B. a cog wheel on the end of the larger drum over
which the endless chain passes. This wheel may be 21 inches in
diameter and the pinion C. which it drives six inches in diameter
The wheel D. may also be twenty one inches in diameter and the
pinion E. on the shaft of the beaters six inches. these relative pro
portions affording a sufficient velocity to the beaters. The bea-
ters have teeth which may be made either of wrought or cast iron
they are to have on their faces the wedge like pointed form
seen at F. The hollow segment G. is best made of cast
iron. It is furnished with teeth of the same form and length
with those on the beaters. The manner in which the teeth on the
beaters pass those on the segment is shewn at H. where they are drawn
of a suitable size and with the requisite space between them to
allow the straw and grain to pass. The teeth I usually make up
wards of two inches in length as, when shorter than this the same
quantity cannot be thrashed there not being sufficient space.
The The pointed or wedge like form of the teeth, their greater length
than in other thrashing machines and the space allowed between
them for the straw are essential features of my machine, and
distinguish it from others which have been made to thresh by
means of teeth. The inclined board I. is for the purpose of feed-
ing. The straw and grain after the thrashing is completed are
received upon an endless apron J. passing over rollers. On this
they are carried up to the endless seive and rake K. This seive and
rake are thus made slats of wood the length of the rollers are at-
tached to leather straps or bands passing round the ends of the rol-
lers. These slats ... may be two or three inches apart and they have
wires projecting from their edges, forming a seive. From the fa-
ces of the slats spikes project which form the rake to lay hold of
the straw. The grain and chaff fall through upon a screen L.
To this screen a vibratory motion is given from a crank on the
shaft of the fan wheel M. or in any other convenient way. The
endless seive and the fan wheel are driven by bands and wheels
from the main Machine. N.N. is a covering extending over the
whole machinery. It is manifest that this thrashing machine
may be driven by other means than my patented Horse-power,
I however deem this the most convenient. What I claim as my
as my improvements are the particular form and management
of the teeth as described and represented, the receiving the
grain and straw upon an endless apron and thus carrying it
up on the endless seive and rake. the particular construction of
of the seive and rake. and the general arrangement of the ma-
chinery by which these objects are effected Witnesses
Thos P. Jones
I. A. Hall Samuel Lane

[illegible]